(12) United States Patent
Kawamura

(10) Patent No.: US 8,329,623 B2
(45) Date of Patent: Dec. 11, 2012

(54) GREASE COMPOSITION AND GREASE-SEALED BEARING

(75) Inventor: Takayuki Kawamura, Mie (JP)

(73) Assignee: NTN Corporation, Osaka (JP)

( * ) Notice: Subject to any disclaimer, the term of this patent is extended or adjusted under 35 U.S.C. 154(b) by 30 days.

(21) Appl. No.: 12/736,226

(22) PCT Filed: Mar. 31, 2009

(86) PCT No.: PCT/JP2009/056600
§ 371 (c)(1),
(2), (4) Date: Sep. 20, 2010

(87) PCT Pub. No.: WO2009/125690
PCT Pub. Date: Oct. 15, 2009

(65) Prior Publication Data
US 2011/0007990 A1    Jan. 13, 2011

(30) Foreign Application Priority Data
Apr. 10, 2008  (JP) .................. 2008-102088

(51) Int. Cl.
C07D 233/14 (2006.01)
C10M 169/04 (2006.01)
B01F 17/34 (2006.01)
C07C 55/20 (2006.01)

(52) U.S. Cl. ........ 508/283; 508/154; 508/165; 508/181; 508/506; 384/322

(58) Field of Classification Search ............... 508/110, 508/154, 165, 506, 283, 181; 384/322
See application file for complete search history.

(56) References Cited

U.S. PATENT DOCUMENTS

| 2005/0009713 | A1 * | 1/2005 | Kohara et al. | 508/165 |
| 2007/0206892 | A1 * | 9/2007 | Iso et al. | 384/462 |
| 2008/0076684 | A1 | 3/2008 | Nanbu | |
| 2009/0270292 | A1 * | 10/2009 | Nonaka et al. | 508/416 |
| 2009/0281008 | A1 * | 11/2009 | Fujinami et al. | 508/154 |

FOREIGN PATENT DOCUMENTS

| EP | 1 878 785 A1 | 1/2008 |
| EP | 1 903 229 A2 | 3/2008 |

(Continued)

OTHER PUBLICATIONS

Kinzig, Barbara J. et al., Innovative Materials/Concepts for Grease Lubricated Bearings, AHS International 63rd Annual Forum Proceedings vol. 11, 2007, p. 1518-1528.

*Primary Examiner* — Ellen McAvoy
*Assistant Examiner* — Vishal Vasisth
(74) *Attorney, Agent, or Firm* — Hedman & Costigan, P.C.; James V. Costigan

(57) ABSTRACT

The present invention provides a grease composition (7) which has a low friction and a low viscosity and is durable at a high temperature and a grease-sealed bearing (1) in which the grease composition is enclosed. The grease composition contains base oil, a thickener, and an additive. The base oil contains an ionic liquid consisting of a cation component and an anion component. The additive contains a corrosion inhibitor such as nitrites, molybdates or dibasic acid salts. The thickener is fluorine resin such as polytetrafluoroethylene. The grease composition (7) is applied to a periphery of each rolling element (4) of the grease-sealed bearing (1).

3 Claims, 1 Drawing Sheet

FOREIGN PATENT DOCUMENTS

| | | |
|---|---|---|
| JP | 2006-232921 A | 9/2006 |
| JP | 2006-249368 A | 9/2006 |
| JP | 2007-002913 A | 1/2007 |
| JP | 2007-231987 A | 9/2007 |
| JP | 2007-303663 A | 11/2007 |
| JP | 2008-056840 A | 3/2008 |
| JP | 2008-074947 A | 4/2008 |
| WO | WO2006/090779 A1 | 2/2006 |

* cited by examiner

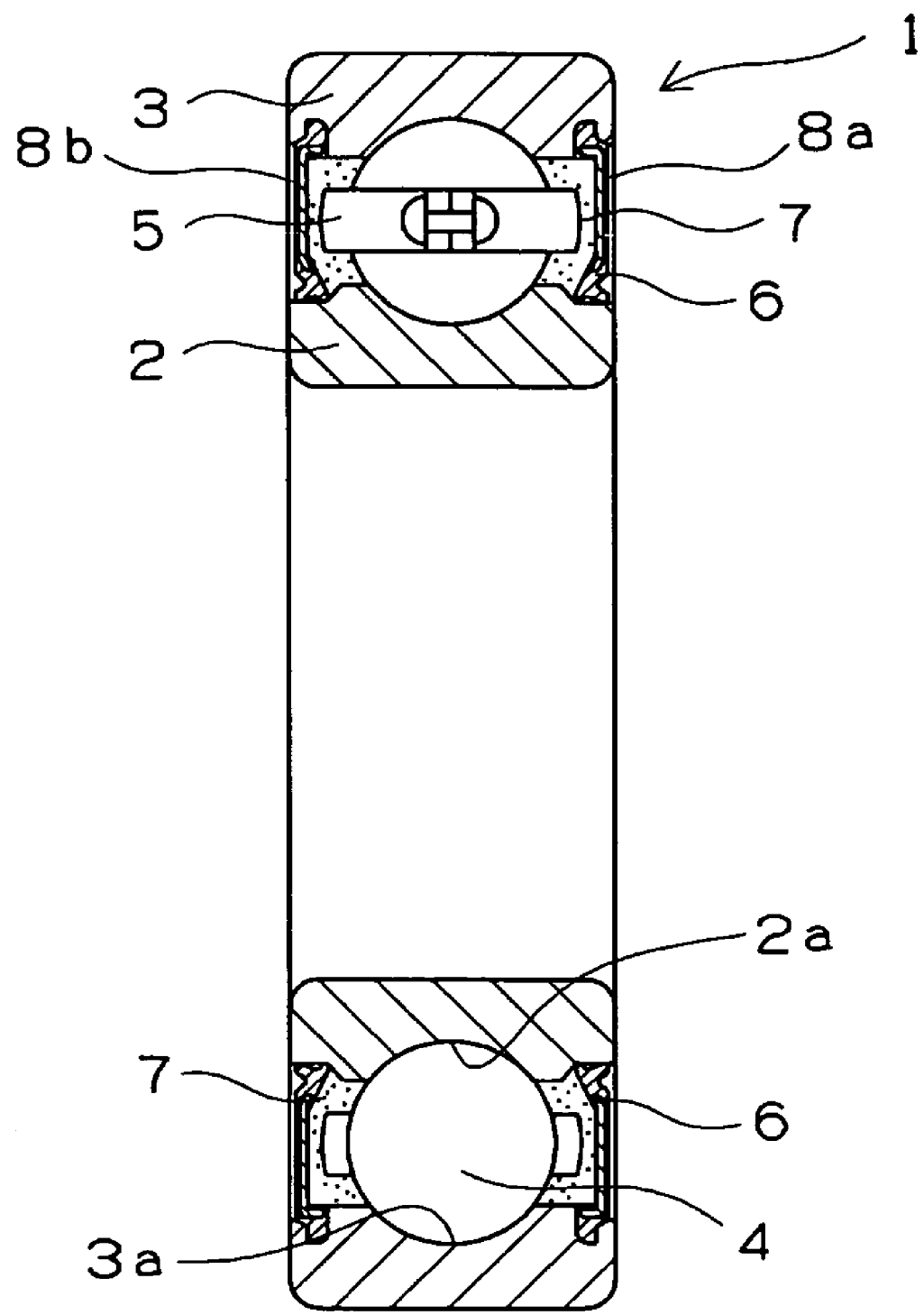

GREASE COMPOSITION AND GREASE-SEALED BEARING

This application is a 371 of PCT/JP2009/056600, filed Mar. 31, 2009.

TECHNICAL FIELD

The present invention relates to a grease composition and a grease-sealed bearing and more particularly to a grease composition in which base oil contains an ionic liquid and the grease-sealed bearing.

BACKGROUND ART

As a lubricant for a bearing, lubricating oil or grease is generally and frequently used. As the base oil composing the main component of the lubricating oil or the grease, it is possible to list mineral oil and synthetic oil such as poly-α-olefin oil, ester oil, silicone oil, and fluorine oil. In recent years, from the standpoint of energy conservation, there are growing demands that the lubricating oil or the grease for use in a bearing or the like has a low friction and a low viscosity. With an increase of demands that a bearing for electric and electronic components of a car is compact and has a high performance, there are growing demands that the lubricant enclosed in the bearing has an improved durability at a high temperature.

As arts suggesting the possibility of the solution of the above-described demands, the fluid bearing unit (see patent document 1) using the lubricant containing the ionic liquid as the conductivity imparting agent and the grease composition (see patent document 2) composed of the base oil containing the ionic liquid and the thickener are known. These arts have been developed by utilizing the property of the ionic liquid which is a molten salt at a normal temperature has a low viscosity owing to the combination of various organic ions.

Description is made in the patent document 1 that because the lubricant contains the ionic liquid which is the conductivity imparting additive, static electricity is not accumulated at the rotational portion, and a stable and low torque loss can be achieved even in the condition of a high-speed rotation and the like. But it is unclear as to whether because the lubricant contains the ionic liquid, the lubricant has the effect of making the viscosity of the lubricant low and the effect of improving the durability thereof at a high temperature. In the patent document 2, although the viscosity of the lubricant is decreased by using the ionic liquid, it is anticipated that the ionic liquid progresses the corrosion of the bearing steel. The durability of the bearing at a high temperature cannot be sufficiently enhanced by the use of the lubricant.

Patent document 1: Japanese Patent Application Laid-Open No. 2004-183868
Patent document 2: Japanese Patent Application Laid-Open No. 2006-249368

DISCLOSURE OF THE INVENTION

Problem to be Solved by the Invention

The present invention has been made to cope with the above-described problems. It is an object of the present invention to provide a grease composition which has a low friction and a low viscosity and is durable at a high temperature and a grease-sealed bearing in which the grease composition is enclosed.

Means for Solving the Problem

A grease composition of the present invention contains base oil, a thickener, and an additive, wherein the base oil contains an ionic liquid consisting of a cation component and an anion component; and the additive contains a corrosion inhibitor.

The corrosion inhibitor contains at least one selected from among nitrites, molybdates, and dibasic acid salts. The corrosion inhibitor contains at least one selected from among sodium nitrite, sodium molybdate, and sodium sebacate.

The corrosion inhibitor is contained in an additive at 0.1 to 29 wt % for a total of an amount of the base oil and an amount of the thickener.

The cation component of the ionic liquid is imidazolium; and the anion component thereof is a bis-trifluoromethylsulfonyl imide anion or a tri(pentafluoroethyl)-trifluorophosphide anion. A mixing ratio of the ionic liquid is not less than 50 wt % for an entirety of the base oil. A kinetic viscosity of the base oil at 40° C. is not more than 100 mm$^2$/second.

The thickener contains fluorine resin. The fluorine resin is polytetrafluoroethylene (hereinafter referred to as PTFE) resin The above-described grease composition is enclosed in the grease-sealed bearing of the present invention. The grease-sealed bearing is used for a motor, an alternator, a compressor, and a fan clutch.

Effect of the Invention

The grease composition of the present invention contains the base oil, the thickener, and the additive. The base oil contains the ionic liquid consisting of the cation component and the anion component. The additive contains the corrosion inhibitor such as the nitrite, the molybdate or the dibasic acid salt. Therefore it is possible to achieve a low friction and a low viscosity and prevent the grease composition from corroding a bearing steel and the like at a high temperature.

The PTFE resin used as the thickener has an excellent performance of thickening the base oil containing the ionic liquid and is capable of improving the durability at a high temperature.

Because the above-described grease is enclosed in the grease-sealed bearing of the present invention, it is possible to achieve a low torque for a bearing and improve the durability of the bearing at a high temperature. Therefore the grease-sealed bearing can be preferably utilized as a bearing of a motor, an alternator, a compressor, and a fan clutch which are used at a high temperature by rotating it at a high speed.

BRIEF DESCRIPTION OF THE DRAWING

FIG. 1 is a sectional view of a deep groove ball bearing shown as an example of a grease-sealed bearing of the present invention.

EXPLANATION OF REFERENCE SYMBOLS AND NUMERALS

1: grease-sealed bearing (rolling bearing)
2: inner ring
3: outer ring
4: rolling element
5: cage
6: sealing member
7: grease composition
8a, 8b: openings

BEST MODE FOR CARRYING OUT THE INVENTION

To enhance the durability of a bearing in which grease using base oil containing an ionic liquid is enclosed at a high temperature, the present inventors have made energetic investigations of the grease and have found that it is possible to greatly improve the durability of the bearing at a high temperature by using a corrosion inhibitor such as the nitrite, the molybdate or the dibasic acid salt in combination with the base oil. The cause has not yet been identified, but it is conceivable that owing to a reaction between the ionic liquid and steel at a high temperature, the generation of corrosion products can be suppressed. The present invention is based on the above-described finding.

The base oil which can be used for the grease composition of the present invention contains the ionic liquid. The ionic liquid means an ion-binding compound which consists of the cation component and the anion component and yet becomes a liquid in the neighborhood of a room temperature. In using the ionic liquid and other oil in combination as the base oil, it is preferable to use not less than 50 wt % of the ionic liquid for the entire base oil to maintain heat resistance.

As the cation component, of the ionic liquid, which can be used in the present invention, aliphatic amine cations (see chemical formula 1 shown below), alicyclic amine cations (see chemical formula 2 shown below), imidazolium cations (see chemical formula 3 shown below), and pyridine cations (see chemical formula 4 shown below) are listed. Of these cation components, it is preferable to use the imidazolium cations because the imidazolium cations are excellent in its heat resistance, low-temperature fluidity, and environmental compatibility. R in the chemical formulas 1 through 4 denotes an alkyl group or an alkoxy group.

As the anion component ($X^-$) in the chemical formulas, a halide ion, $SCN^-$, $BF_4^-$, $ClO_4^-$, $PF_6^-$, $(CF_3SO_2)_2N^-$, $(CF_3CF_2SO_2)_2N^-$, $CF_3SO_3^-$, $CF_3COO^-$, $Ph_4B^-$, $(CF_3SO_2)_3C^-$, and $PF_3(C_2F_5)_3^-$ are listed. Of these anion components, it is preferable to use $(CF_3SO_2)_2N^-$ (bis-trifluoromethylsulfonyl-imide anion) and $PF_3(C_2F_5)_3^-$ (tri(pentafluoroethyl)-trifluorophosphide anion) because these anion components are excellent in the heat resistance, low-temperature fluidity, and environmental compatibility thereof.

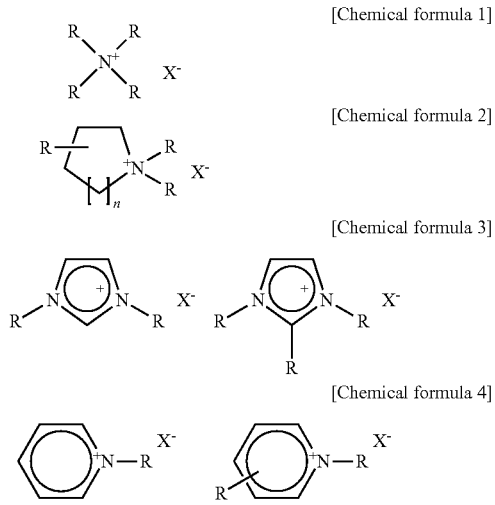

[Chemical formula 1]

[Chemical formula 2]

[Chemical formula 3]

[Chemical formula 4]

It is preferable that in the present invention, the kinetic viscosity of the base oil is not more than 100 mm²/second at 40° C. When the kinetic viscosity thereof exceeds 100 mm²/second, it is impossible to make the viscosity of the grease sufficiently low. When only the ionic liquid is used as the base oil, the kinetic viscosity of the base oil is adjustable in the above-described range by using one kind of the ionic liquid or not less than two kinds thereof in combination.

As thickeners that can be used for the grease composition of the present invention, it is possible to list soap such as lithium soap, lithium complex soap, calcium soap, calcium complex soap, aluminum soap, and aluminum complex soap; a urea compound such as a diurea compound and a polyurea compound; and fluorine resin such as PTFE resin, a tetrafluoroethylene-perfluoroalkylvinyl ether copolymer (PFA) resin, and a tetrafluoroethylene-hexafluoropropylene copolymer (FEP) resin Of these thickeners, it is favorable to use the fluorine resin having a good heat resistance to suppress a property change of the grease at a high temperature. Of the fluoro resins, it is especially favorable to use the PTFE resin excellent in the performance of thickening the ionic liquid which the base oil.

In the present invention, the thickener is contained favorably at 3 to 70 wt % and more favorably at 5 to 60 wt % for the entire grease composition. When the content of the thickener is less than 3 wt %, its thickening effect decreases and thus it becomes difficult to obtain grease having a desired worked penetration. When the content of the thickener exceeds 70 wt %, the obtained grease is so hard that it is difficult to obtain a desired effect.

As the corrosion inhibitor which can be used in the present invention, it is preferable to use nitrites, molybdates, and dibasic acid salts. As the dibasic acid salts, adipates, suberates, pimelates, azelates, and sebacates are listed. The sebacates are more favorable than the other dibasic acid salts. As representatives of these salts, potassium salts, sodium salts, and lithium salts are listed. Of these salts, it is especially preferable to use the sodium salts.

The mixing amount of the corrosion inhibitor which can be used in the present invention is 0.1 to 29 wt % and preferably 1 to 20 wt % for the total of the amount of the base oil and that of the thickener. When the mixing amount of the corrosion inhibitor is less than 0.1 wt %, it is impossible to obtain the effect to be provided thereby. When the mixing amount of the corrosion inhibitor exceeds 29 wt %, there is no increase in the effect and there is a cost disadvantage.

It is possible that the grease composition of the present invention contains various additives such as an extreme pressure agent, an oiliness agent, and the like conventionally used if necessary.

The grease-sealed bearing of the present invention is described below with reference to the drawing. FIG. 1 is a sectional view of a deep groove ball bearing in which the grease composition of the present invention is enclosed. The deep groove ball bearing has an inner ring 2 having an inner ring rolling surface 2a on its peripheral surface, an outer ring 3 concentric with the inner ring 2 and having an outer ring rolling surface 3a on its inner peripheral surface, and a plurality of rolling elements 4 disposed between the inner ring rolling surface 2a and the outer ring rolling surface 3a. The bearing has a cage 5 holding a plurality of the rolling elements 4. A sealing member 6 fixed to the outer ring 3 are provided at openings 8a and 8b formed at both axial ends of the inner ring 2 and the outer ring 3. A grease composition 7 is applied to at least a periphery of each rolling element 4. The grease composition 7 is the grease composition of the present invention.

The present invention is further described with reference to examples and comparative examples. But the present invention is not limited thereto.

Examples 1 through 3

A grease composition was obtained by using the base oil, the thickener, and the corrosion inhibitor at the mixing ratios shown in table 1. As the ionic liquid which is the base oil, 1-octyl-3-methylimidazolium-bis-trifluoromethylsulfonyl-imide (shown by chemical formula 5 shown below; described as OMI-TFSI in table 1) produced by Merck & Co., Inc in which the cation component consisted of a 1-octyl-3-methylimidazolium cation and the anion component consisted of a bis-trifluoromethylsulfonyl-imide anion was used. The obtained grease composition was used in a high temperature and high speed grease life test shown below as specimen grease to measure the grease lifetime at a high temperature and a high speed. Table 1 shows the results.

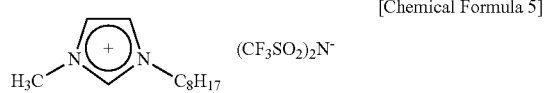

[Chemical Formula 5]

<High-Temperature and High-Speed Grease Life Test>

The obtained specimen grease was enclosed in a rolling bearing 6204 (inner diameter of 20 mm×outer diameter of 47 mm×thickness of 14 mm) at 38% of the volume of the entire space thereof. Each rolling bearing was rotated at axial and radial loads of 67N, a bearing temperature of 180° C., and a rotational speed of 10000 rpm. A period of time till each rolling bearing was seized was measured as the lifetime of each grease at a high temperature and a high speed.

Examples 4, 6 through 10 and Comparative Example 7

A grease composition was obtained by using the base oil, the thickener, and the corrosion inhibitor at the mixing ratios shown in table 1. As the ionic liquid which is the base oil, 1-hexyl-3-methylimidazolium-bis-trifluoromethylsulfonyl-imide (shown by chemical formula 6 shown below; described as HMI-TFSI in table 1) produced by Merck & Co., Inc in which the cation component consisted of a 1-hexyl-3-methylimidazolium cation and the anion component consisted of a bis-trifluoromethylsulfonyl-imide anion was used. The obtained grease composition was used in the above-described high temperature and high speed grease life test as a specimen grease to measure the grease lifetime at a high temperature and a high speed. Table 1 shows the results.

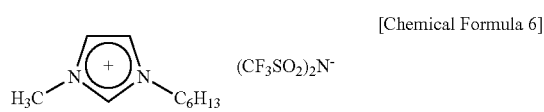

[Chemical Formula 6]

Example 5

A grease composition was obtained by using the base oil, the thickener, and the corrosion inhibitor at the mixing ratios shown in table 1. As the ionic liquid which is the base oil, 1-hexyl-3-methylimidazolium-tri(pentafluoroethyl) trifluoro phosphide anion (shown by chemical formula 7 shown below; described as HMI-$(C_2F_5)_3PF_3^-$ in table 1) produced by Merck & Co., Inc in which the cation component consisted of the 1-hexyl-3-methylimidazolium cation and the anion component consisted of a trifluoro-tri(pentafluoroethyl) phosphide anion was used. The obtained grease composition was used in the above-described high temperature and high speed grease life test as specimen grease to measure the grease lifetime at a high temperature and a high speed. Table 1 shows the results.

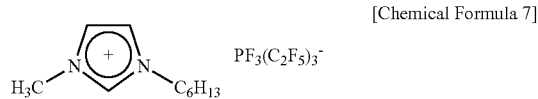

[Chemical Formula 7]

Comparative Examples 1, 2

A grease composition was obtained by using the base oil which did not contain the ionic liquid and a urea-based thickener at the mixing ratios shown in table 1. The obtained grease composition was used in the above-described high temperature and high speed grease life test as a specimen grease to measure the grease lifetime at a high temperature and a high speed. Table 1 shows the results.

Comparative Example 3

Except that the corrosion inhibitor was not used, a grease composition was obtained in a manner similar to that of the example 1. The obtained grease composition was used in the above-described high temperature and high speed grease life test as specimen grease to measure the grease lifetime at a high temperature and a high speed. Table 1 shows the results.

Comparative Example 4

Except that the corrosion inhibitor was not used, a grease composition was obtained in a manner similar to that of the example 5. The obtained grease composition was used in the above-described high temperature and high speed grease life test as specimen grease to measure the grease lifetime at a high temperature and a high speed. Table 1 shows the results.

Comparative Example 5

Except that the corrosion inhibitor was not used, a grease composition was obtained in a manner similar to that of the example 4. The obtained grease composition was used in the above-described high temperature and high speed grease life test as a specimen grease to measure the grease lifetime at a high temperature and a high speed. Table 1 shows the results.

Comparative Example 6

A grease composition was obtained by using the base oil and the urea-based thickener at the mixing ratio shown in table 1. As the ionic liquid which is the base oil, the 1-hexyl-3-methylimidazolium-bis-trifluoromethylsulfonyl-imide (shown by chemical formula 6 shown below; described as HMI-TFSI in table 1) produced by Merck & Co., Inc in which the cation component consisted of the 1-hexyl-3-methylimidazolium cation and the anion component consisted of the bis-trifluoromethylsulfonyl-imide anion was used. The obtained grease composition was used in the above-described high temperature and high speed grease life test as specimen grease to measure the grease lifetime at a high temperature and a high speed. Table 1 shows the results.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Components of grease composition and mixing ratio(part by weight) | | | | | | | | | | |
| Base grease | | | | | | | | | | |
| Base oil | | | | | | | | | | |
| Synthetic hydrocarbon oil [1] | — | — | — | — | — | — | — | — | — | — |
| Alkyldiphenyl ether oil [2] | — | — | — | — | — | — | — | — | — | — |
| OMI-TFSI [3] | 70 | 70 | 70 | — | — | — | — | — | — | — |
| HMI-$(C_2F_5)_3PF_3^-$ [4] | — | — | — | — | 70 | — | — | — | — | — |
| HMI-TFSI [5] | — | — | — | 70 | — | 70 | 70 | 70 | 70 | 70 |
| Thickener | | | | | | | | | | |
| Polytetrafluoroethylene resin | 30 | 30 | 30 | 30 | 30 | 30 | 30 | 30 | 30 | 30 |
| Amine: octylamine | — | — | — | — | — | — | — | — | — | — |
| Amine: cyclohexylamine | — | — | — | — | — | — | — | — | — | — |
| Diisocyanate: MDI [6] | — | — | — | — | — | — | — | — | — | — |
| (Total of base grease) | 100 | 100 | 100 | 100 | 100 | 100 | 100 | 100 | 100 | 100 |
| Additive | | | | | | | | | | |
| Sodium nitrite | 1 | — | — | — | — | — | — | — | — | — |
| Sodium molybdate | — | 3 | — | — | — | — | — | — | — | — |
| Sodium sebacate | — | — | 5 | 3 | 5 | 1 | 5 | 10 | 15 | 20 |
| Lifetime of grease at high temperature and high speed, h | >1000 | >1000 | >1000 | >1200 | >1000 | 850 | >1500 | >1500 | >1500 | 770 |

| | Comparative example | | | | | | |
|---|---|---|---|---|---|---|---|
| | 1 | 2 | 3 | 4 | 5 | 6 | 7 |
| Components of grease composition and mixing ratio(part by weight) | | | | | | | |
| Base grease | | | | | | | |
| Base oil | | | | | | | |
| Synthetic hydrocarbon oil [1] | — | 85 | — | — | — | — | — |
| Alkyldiphenyl ether oil [2] | 80 | — | — | — | — | — | — |
| OMI-TFSI [3] | — | — | 70 | — | — | — | — |
| HMI-$(C_2F_5)_3PF_3^-$ [4] | — | — | — | 70 | — | — | — |
| HMI-TFSI [5] | — | — | — | — | 70 | 80 | 70 |
| Thickener | | | | | | | |
| Polytetrafluoroethylene resin | — | — | 30 | 30 | 30 | — | 30 |
| Amine: octylamine | 10.2 | 5.1 | — | — | — | — | — |
| Amine: cyclohexylamine | — | 2.2 | — | — | — | 8.8 | — |
| Diisocyanate: MDI [6] | 9.8 | 7.7 | — | — | — | 11.2 | — |
| (Total of base grease) | 100 | 100 | 100 | 100 | 100 | 100 | 100 |
| Additive | | | | | | | |
| Sodium nitrite | — | — | — | — | — | — | — |
| Sodium molybdate | — | — | — | — | — | — | — |
| Sodium sebacate | — | — | — | — | — | — | 30 |
| Lifetime of grease at high temperature and high speed, h | 450 | 270 | 130 | 60 | 120 | 110 | 370 |

[1] Produced by Nippon Steel Chemical Co., Ltd.: SYNFLUID 801, kinetic viscosity at 40° C.: 97 mm$^2$/second
[2] Produced by MORESCO Corporation: Moresco Hilube LB100, kinetic viscosity at 40° C.: 97 mm$^2$/second
[3] Produced by Merck & Co., Inc.: kinetic viscosity at 20° C.: 91 mm$^2$/second
[4] Produced by Merck & Co., Inc.: kinetic viscosity at 20° C.: 74 mm$^2$/second
[5] Produced by Merck & Co., Inc.: kinetic viscosity at 20° C.: 44 mm$^2$/second
[6] Produced by Nippon Polyurethane Industry Co., Ltd.: Millionate MT As shown in table 1, the lubricants of the examples 1 through 10 are useful for a bearing rotating at a high temperature and a high speed.

INDUSTRIAL APPLICABILITY

Because the grease composition of the present invention has a low friction and a low viscosity and is capable of enhancing the durability of the bearing at a high temperature. Therefore the grease composition can be preferably utilized as a lubricant for a bearing which is rotated at a high speed and a high temperature. The grease-enclosed bearing of the present invention can be preferably utilized for electric and electronic components such as a motor, an alternator, a compressor, and the like.

The invention claimed is:
1. A grease-sealed bearing in which a grease composition is enclosed;
said grease composition being a grease composition for a bearing comprising a bearing steel comprising a base oil, a thickener, and an additive, wherein said base oil con- tains an ionic liquid consisting of a cation component and an anion component; said cation component of said ionic liquid is imidazolium and said anion component thereof is a bis-trifluoromethylsulfonyl imide anion or a tri(pentafluoroethyl)-trifluorophosphide anion; said thickener contains polytetrafluoroethylene resin; said additive contains a corrosion inhibitor containing sodium sebacate and a mixing amount of said sodium sebacate is 5 to 15 wt % for a total of an amount of said base oil and an amount of said thickener wherein a mixing ratio of said ionic liquid is not less than 50 wt % for an entirety of said base oil.

2. The grease-sealed bearing according to claim 1, wherein a kinetic viscosity of said base oil at 40° C. is not more than 100 mm$^2$/second.

3. The grease-sealed bearing according to claim 1, wherein said grease-sealed bearing is used for a motor, an alternator, a compressor, or a fan clutch.

* * * * *